Patented Dec. 30, 1947

2,433,776

UNITED STATES PATENT OFFICE 2,433,776

PREPARATION OF SOLS

Morris D. Marshall, Arlington, Mass., assignor to Monsanto Chemical Company, St. Louis, Mo., a corporation of Delaware No Drawing. Original application September 3, 1941, Serial No. 409,434, now Patent No. 2,386,247, dated October 9, 1945. Divided and this application August 28, 1945, Serial No. 613,221

5 Claims. (Cl. 252—309)

This invention relates to the preparation of sols, and particularly to the preparation of substantially anhydrous and salt free organosols, such as sols containing certain alcohols, ethers, ether-alcohols, esters, ketones, hydrocarbons and the like as the continuous phase.

There are several known methods for making substantially anhydrous organosols. For example, it is old to add alcohol to aqueous silicic acid, and then to remove the water by such means as dialysis or exposure in a confined space to the drying action of dry carbonate of potash or quicklime. It is also old to add glycerine to a 2% colloidal silicic acid solution with heat and agitation, and then to evaporate the water to obtain a clear transparent, highly viscous mass of colloidal silicic acid in glycerine. However, the products prepared in the above manner are either of low concentration or of low stability and therefore are not suitable for many industrial purposes for which they might otherwise be adapted.

It is accordingly a primary object of this invention to prepare very stable and highly dispersed inorganic oxide sols in substantially anhydrous organic solvents which are of unusually high concentrations, e. g. contain as much as twenty-five per cent oxide or more.

A further object of the invention is to prepare sols of the type described containing either water-miscible or water-immiscible organic solvents as the continuous phase.

A further object of the invention is to prepare substantially anhydrous sols of a relatively high degree of concentration and stability containing either aromatic or aliphatic hydrocarbons as the continuous phase.

A still further object of the invention is to prepare sols of the above nature which contain only a relatively small amount of inorganic salt.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is in general carried out by first forming an aquasol containing a colloidal inorganic oxide and a dissolved inorganic salt, then adding a water-miscible organic solvent to the aquasol in an amount sufficient to precipitate the inorganic salt and to permit substantially complete removal of the water by distillation, thereafter removing the precipitated inorganic salt, as by filtration, centrifuging or the like, and finally removing the water by distillation.

The above process results in the production of organosols which are substantially free of water, i. e. contain not more than about 1% of water. Products containing only traces of water may, however, easily be obtained in accordance with the invention by subjecting the above sols to a second or third distillation, which may or may not involve replacement of the original organic solvent with another organic solvent. Although the organic solvent initially employed should be miscible with water, the solvent used to replace it may be either water-miscible or water-immiscible.

The organic solvent initially employed should be of such a nature as to cause substantially complete precipitation of inorganic salts and should either have a boiling point higher than that of water, i. e. sufficiently higher to permit substantially complete removal of the water by simple distillation, or it should be capable of forming a constant boiling mixture with water, either by itself or in combination with a third or a plurality of additional components, which mixture can then be fractionally or otherwise distilled off, leaving as the residue a sol containing the desired organic liquid as the dispersing medium or continuous phase. A most suitable solvent for forming a binary C. B. M. (constant boiling mixture) with water is normal propyl alcohol, which not only is highly miscible with water, but is relatively cheap and may be readily obtained in large quantities. Ethyl alcohol may also be used in accordance with this invention, but as ethyl alcohol does not form a satisfactory binary C. B. M. with water for the purposes of this invention, a third component, such as benzene, dichloroethylene, trichloroethylene, and the like, is added, which forms a mixture capable of boiling off as a ternary C. B. M. This mixture is fractionally distilled to produce a sol having substantially anhydrous ethyl alcohol as the continuous phase.

The sols made by distilling constant boiling mixtures, such as those described above, cannot only be made in an unusually high state of concentration, but are substantially free of water. Thus, they may be directly made with as little as 1% or less of $H_2O$. Moreover, they may be readily processed, as by replacement, to produce sols having relatively low boiling or high boiling water-miscible or immiscible organic solvents as the continuous phase. For example, the ethyl or propyl alcohol in the sols prepared as described above may be replaced with such organic liquids as Cellosolves, high boiling alcohols, ethers, ether-alcohols, ketones, esters, aliphatic and aromatic hydrocarbons and the like, by mixing the initial alcohol sol with one or more of the above solvents and distilling off the initial alcohol, either as such or in the form of a constant boiling mixture. The resulting sols have been found to contain even less water than the sols prepared directly from the constant boiling mixtures.

As suitable organic solvents or liquids for replacing the initial alcohol sols may be mentioned such substances as Cellosolve, methyl and butyl Cellosolve, the butyl and amyl alcohols, diethyl Cellosolve, diethyl Carbitol, methyl isobutyl ketone, ethyl and butyl acetate, benzene, toluene, and aliphatic hydrocarbons, such as "lactol spirits."

Another method of further reducing the water content of sols formed from binary constant boiling mixture, such as the propyl alcohol sol prepared as described above, involves forming a ternary constant boiling mixture by adding to the resulting sol an organic solvent, such as benzene, dichloroethylene, and trichloroethylene and an additional quantity of the original organic solvent, and then fractionally distilling the resulting ternary mixture. The distillation product is an organosol containing only a trace of water. Thus, in the case of propyl alcohol it is possible to distill off both binary and ternary constant boiling mixtures with the result that sols having this alcohol as the continuous phase may be readily made containing very minute amounts of water.

The sols prepared from ternary constant boiling mixtures and containing only a trace of water, such as the propyl alcohol and like sols prepared as described immediately above, may be readily converted to sols containing water-immiscible organic solvents as the continuous phase. For example, the propyl alcohol in such sols may be replaced by toluene or other hydrocarbons by merely mixing the hydrocarbon with the substantially water free alcohol sol and distilling the resulting mixture. Sols of this nature are ordinarily very difficult to obtain, but may be readily prepared in accordance with the above method.

The organic solvent or liquid employed should be added to the aquasol in sufficient amounts not only to precipitate the inorganic salt contained therein, but to prevent gelation during the early stages of the distillation during which water is removed, and to permit substantially complete removal of the water. This usually results in the formation of an intermediate organo-aquasol containing about 3% silica.

The aquasols treated or used in connection with the above processes may be prepared in various ways. In the case of silica sol, for example, they are preferably prepared by reacting an aqueous solution of sodium silicate with dilute sulfuric acid in suitable proportions. Any other suitable method may however be employed, depending upon the particular oxide sol which it is desired to prepare.

In general, it is preferable to use aquasols having a high concentration of the colloidal oxide in connection with the processes of this invention, as this permits the use of less organic solvent than would otherwise be required to precipitate out the inorganic salt and also requires less distillation to remove water.

It is also usually preferable, particularly in the case of silica sols, to prepare the aquasol and to precipitate the salt at temperatures of not above 15° C. Moreover, it is usually preferable to prepare and use an aquasol having a pH of between 2 and 4 to insure maximum stability during the preparation of the organosols. However, the invention should not be limited in these respects, as it is possible to obtain stable and substantially anhydrous sols of high concentration without resorting to temperatures below normal, and without operating in the above mentioned pH range.

A more complete and thorough understanding of the invention will be obtained from the following examples:

*Example I.*—Three hundred fifty-eight pounds of sodium silicate containing 28.7% $SiO_2$, 8.9% $Na_2O$ and 62.4% $H_2O$ are diluted with one hundred sixty-two pounds of water. This mixture is then added to one hundred sixty-three and one-half pounds of 31% sulfuric acid and the mass is agitated to distribute the silicate throughout the acid. The mixing is carried out in a suitable acid resistant apparatus at a temperature of about 15° C., and results in a silica sol having a pH of about 2.5. One thousand three hundred and seventy-five pounds of Cellosolve are then added to the sol gradually with stirring, while maintaining the temperature at about 15° C. This causes precipitation of the inorganic salt, which is then removed by filtering or centrifuging. To the clear sol one thousand five hundred and forty pounds of additional Cellosolve are added so that the $SiO_2$ content is reduced to about 3%. The sol is then distilled in a lead still equipped with a stirrer and a fractionating column, the distillation being discontinued when the sol in the still is substantially free of water and contains about 25% $SiO_2$.

*Example II.*—Three hundred fifty-eight pounds of sodium silicate containing 28.7% $SiO_2$, 8.9% $Na_2O$ and 62.4% $H_2O$ are diluted with one hundred sixty-two pounds of water. This mixture is then added to one hundred sixty-three and one-half pounds of 31% sulfuric acid and the mass is agitated to distribute the silicate throughout the acid. The mixing is carried out in a suitable acid resistant apparatus at a temperature of about 15° C., and results in a silica sol having a pH of about 2.5. One thousand three hundred and seventy-five pounds of normal propyl alcohol are then added to the sol gradually with stirring while maintaining the temperature at about 15° C. This causes precipitation of substantially all of the inorganic salt, which is then removed by filtering or centrifuging. To the clear sol one thousand five hundred and forty pounds of additional normal propyl alcohol are added, which reduces the $SiO_2$ content to about 3%. The sol is then distilled in a lead still equipped with a stirrer and a fractionating column. During the distillation the refluxing ratio is maintained in such a manner as to obtain 73% propanol in the first 50% of the distillate, about 92% propanol in the next 20% of the distillate, and about 99% propanol in the last 30%, which leaves as a residue a sol containing about 25% $SiO_2$.

*Example III.*—Three hundred fifty-eight pounds of sodium silicate containing 28.7% $SiO_2$, 8.9% Na₂O and 62.4% H₂O are diluted with one hundred sixty-two pounds of water. This mixture is then added to one hundred sixty-three and one-half pounds of 31% sulfuric acid and the mass is agitated to distribute the silicate throughout the acid. The mixing is carried out in a suitable acid resistant apparatus at a temperature of about 15° C., and results in a silica sol having a pH of about 2.5. One thousand three hundred and seventy-five pounds of ethyl alcohol (containing about 92% $C_2H_5OH$ by weight) are then added to the sol gradually with stirring, while maintaining the temperature at about 15° C. This causes precipitation of substantially all of the inorganic salt, which is removed by filtering or centrifuging. To the clear sol one thousand five hundred and forty pounds of additional alcohol are added, which reduces the $SiO_2$ content to about 3%. The sol is then distilled in a lead still equipped with a stirrer and a fractionating column having 28 theoretical plates. Eight hundred and ten pounds of benzol are gradually introduced into the top of the column during the first part of the run. The column is operated at capacity and the temperature at the top is maintained at 65° C. by proper reflux control, until all of the lower aqueous layer has been separated and removed. A high reflux ratio is then maintained until all the benzol-alcohol fraction has been removed. Substantially anhydrous alcohol is then removed at a rapid rate until the sol in the still contains an $SiO_2$ content of about 25%.

*Example IV.*—A mixture containing one part by weight of the 25% propyl alcohol sol prepared in accordance with Example II, two parts by weight of anhydrous normal propanol and one and one-quarter parts by weight of benzol is distilled in a distillation apparatus equipped with a stirrer and a fractionating column having 28 theoretical plates, which results first in the removal of the water layer which forms and then in the removal of the C. B. M. containing normal propanol and benzol. The distillation is continued until the final dehydrated sol, containing only a trace of water, has been concentrated to a 25% $SiO_2$ content.

*Example V.*—Five parts by weight of toluene are added to one part by weight of the normal propanol sol containing 25% $SiO_2$ obtained in accordance with Example IV. The resulting mixture is then distilled in a distillation apparatus provided with a stirrer and a fractionating column until all the normal propyl alcohol is removed as a C. B. M. and the resulting toluene sol contains an $SiO_2$ content of about 15%.

*Example VI.*—Two and one-half parts by weight of butyl acetate are added to one part by weight of the normal propyl alcohol sol containing 25% $SiO_2$ obtained in accordance with Example II. The mixture is then distilled in a distillation apparatus provided with a stirrer and a fractionating column until all the normal propyl alcohol is removed, whereupon the distillation is continued until the resulting butyl acetate sol residue contains about 25% $SiO_2$.

As indicated by the above examples, the method of this invention not only permits the production of highly concentrated and stable organosols which are substantially free of water, but they render it possible to prepare substantially salt free sols having a wide variety of organic solvents as the continuous phase, without resorting to cumbersome and time consuming methods of removing the salt, such as dialysis or the like. The organic solvents used or present in the final sol may be either water-miscible or water immiscible, high boiling or low boiling. Moreover, they may comprise or consist of such hydrocarbons or mixtures of hydrocarbons, as benzene, toluene, lactol spirits or the like, which heretofore it has not been possible to successfully prepare as sols of the type described.

Although the above examples refer solely to the preparation of organosols containing an individual organic solvent, it should be understood that the invention is not limited to such sols, and that sols may also be prepared containing mixtures of organic solvents. For example, an organosol may be prepared directly, using a mixture of water-miscible solvents instead of just one, or the solvent or solvents in the initial organosol may be replaced by any suitable mixture of organic solvents, which in such case may be either water-miscible or water-immiscible.

The term "organic solvents" employed herein and in the appended claims is intended to refer to the type of solvents commonly employed in the field of coating compositions, such as varnishes, lacquers, and the like, and commonly understood by chemists as suitable for such purposes. The term is also intended to include, however, alcohols, which are usually not employed as solvents in the coating art.

The term "Cellosolve" represents the mono ethyl ether of ethylene glycol, while "methyl, ethyl, butyl and diethyl Cellosolve" represents the methyl, ethyl, butyl and diethyl ethers of ethylene glycol respectively. The term "lactol spirits" represents a product consisting of homogeneous closely fractionated portions of petroleum crude oil which are derived from petroleum by distillation and constitute a mixture of hydrocarbons having an evaporation rate similar to or close to that of toluene. The product has a specific gravity of .7313 at 60° F. and the following A. S. T. M. distillation range:

| Per cent Distilled | Temperature |
|---|---|
|  | °F. |
| Initial boiling point | 200 |
| 50% Distilled | 220 |
| 90% Distilled | 240 |

This application is a division of my co-pending application Serial No. 409,434, filed September 3, 1941, now Patent No. 2,386,247, granted October 9, 1945, which is a continuation-in-part of application Serial No. 272,404, filed May 8, 1939, and granted June 9, 1942, as Patent No. 2,285,449.

What I claim is:

1. The method of preparing a stable and substantially anhydrous organosol composed of a colloidal inorganic oxide and an organic solvent which comprises forming an aquasol containing a colloidal inorganic oxide and a dissolved inorganic salt, adding propyl alcohol in an amount sufficient to precipitate the inorganic salt and to permit substantially complete removal of the water in said aquasol by distillation, then removing the precipitated inorganic salt, removing completely the water by distillation, and then adding an organic solvent selected from the group consisting of butyl alcohol and butyl acetate, and removing the propyl alcohol by simple distillation.

2. The method of preparing a stable and substantially anhydrous organosol composed of colloidal silica and butyl acetate which comprises forming an aquasol containing colloidal silica and a dissolved inorganic salt, adding normal propyl alcohol in an amount sufficient to precipitate the inorganic salt and to permit substantially complete removal of the water in said aquasol by distillation, removing the precipitated inorganic salt and removing completely the water by distillation, and then adding butyl acetate and removing the normal propyl alcohol by distillation.

3. The method of preparing a stable and substantially anhydrous organosol composed of colloidal silica and butyl alcohol which comprises forming an aquasol containing colloidal silica and dissolved inorganic salt, adding normal propyl alcohol in an amount sufficient to precipitate the inorganic salt and to permit substantially complete removal of the water in said aquasol by distillation, removing the precipitated inorganic salt and removing the water by distillation, and then adding butyl alcohol and removing the normal propyl alcohol by distillation.

4. A stable and substantially anhydrous butyl acetate sol composed of a colloidal inorganic oxide and butyl acetate, said sol containing at least about 15% of said inorganic oxide and a small amount of an acid-forming substance.

5. A stable and substantially anhydrous butyl alcohol sol composed of a colloidal inorganic oxide and butyl alcohol, said sol containing at least about 15% of said inorganic oxide and a small amount of an acid-forming substance.

MORRIS D. MARSHALL.

REFERENCES CITED

The following references are of record in the file of this patent:

UNITED STATES PATENTS

| Number | Name | Date |
|---|---|---|
| 2,386,247 | Marshall | Oct. 9, 1945 |
| 2,375,738 | White | May 8, 1945 |
| 2,391,253 | Marshall | Dec. 18, 1945 |